(12) United States Patent
Viedt

(10) Patent No.: US 10,413,108 B2
(45) Date of Patent: Sep. 17, 2019

(54) CURTAIN ROD WITH INTEGRATED SPEAKERS

(71) Applicant: Cash J. Viedt, Las Vegas, NV (US)

(72) Inventor: Cash J. Viedt, Las Vegas, NV (US)

( * ) Notice: Subject to any disclaimer, the term of this patent is extended or adjusted under 35 U.S.C. 154(b) by 105 days.

(21) Appl. No.: 15/832,155

(22) Filed: Dec. 5, 2017

(65) Prior Publication Data

US 2018/0092485 A1 Apr. 5, 2018

Related U.S. Application Data

(63) Continuation-in-part of application No. 15/224,947, filed on Aug. 1, 2016, now Pat. No. 9,883,763.

(51) Int. Cl.

| | |
|---|---|
| *A47H 1/02* | (2006.01) |
| *A47K 10/48* | (2006.01) |
| *F26B 23/04* | (2006.01) |
| *F26B 21/06* | (2006.01) |
| *G01K 1/14* | (2006.01) |
| *H04R 1/02* | (2006.01) |
| *F26B 21/00* | (2006.01) |
| *A47K 3/38* | (2006.01) |
| *A47H 1/022* | (2006.01) |

(52) U.S. Cl.
CPC ............. *A47H 1/02* (2013.01); *A47H 1/022* (2013.01); *A47K 3/38* (2013.01); *A47K 10/48* (2013.01); *F26B 21/001* (2013.01); *F26B 21/004* (2013.01); *F26B 21/06* (2013.01); *F26B 23/04* (2013.01); *G01K 1/14* (2013.01); *H04R 1/028* (2013.01); *A47H 2001/0215* (2013.01); *H04R 2420/07* (2013.01)

(58) Field of Classification Search
CPC ...... F26B 21/001; F26B 21/004; F26B 23/04; F26B 21/06; G01K 1/14; H04R 2420/07; H04R 1/028; A47H 2001/0215; A47H 1/07; A47H 1/02; A47H 1/022; A47K 3/38; A47K 10/38
USPC ............................................. 34/90
See application file for complete search history.

(56) References Cited

U.S. PATENT DOCUMENTS

| | | | | |
|---|---|---|---|---|
| 5,404,419 A | * | 4/1995 | Artis, Jr. ........... | A47K 10/48 34/239 |
| 5,857,262 A | * | 1/1999 | Bonnema ........... | A45D 20/06 34/97 |
| 6,327,994 B1 | * | 12/2001 | Labrador ........... | B01D 61/10 114/382 |

(Continued)

*Primary Examiner* — Stephen M Gravini

(57) ABSTRACT

A shower curtain and window curtain hanging structure provides constant stream of heated or ambient air as well as the ability to sound audio from an external source. The hanging structure includes a tubular body, an at least one fan assembly, a power supply, an at least one waterproof speaker, a microphone, and a wireless communication device. The tubular body supports various types of curtains. The fan assembly, and the wireless communication device are internally mounted within the tubular body. The waterproof speaker and the microphone is integrated into an external surface of the tubular body in order to sound audio towards a user and providing calling services. The fan assembly includes an impeller, a heating element, and an electric motor. The impeller is powered by the electric motor to forces air to pass by the heating element and expelling heated air onto the user.

10 Claims, 7 Drawing Sheets

(56) References Cited

U.S. PATENT DOCUMENTS

| | | | | |
|---|---|---|---|---|
| 6,449,870 | B1* | 9/2002 | Perez | A45D 20/12 |
| | | | | 34/96 |
| 6,928,235 | B2* | 8/2005 | Pollack | A47K 10/48 |
| | | | | 34/90 |
| 7,380,347 | B2* | 6/2008 | Coats | A45D 20/12 |
| | | | | 34/97 |
| 8,458,922 | B2* | 6/2013 | Parisi | A45D 27/48 |
| | | | | 108/115 |
| 8,763,750 | B1* | 7/2014 | Berkman | H04R 1/021 |
| | | | | 181/150 |
| 9,326,578 | B2* | 5/2016 | Yoshidome | A45D 20/12 |
| 9,474,347 | B2* | 10/2016 | Pedroarena | A45D 20/12 |
| 9,883,763 | B1* | 2/2018 | Viedt | A47K 10/48 |
| 2002/0157276 | A1* | 10/2002 | Mujica | A45D 20/10 |
| | | | | 34/97 |
| 2006/0098961 | A1* | 5/2006 | Seutter | A47K 10/48 |
| | | | | 392/383 |
| 2008/0225510 | A1* | 9/2008 | Rocha | F21V 33/0056 |
| | | | | 362/86 |
| 2017/0101209 | A1* | 4/2017 | Viedt | B65D 11/04 |
| 2018/0028010 | A1* | 2/2018 | Viedt | A47K 10/48 |
| 2018/0092485 | A1* | 4/2018 | Viedt | A47K 3/38 |

\* cited by examiner

CURTAIN ROD WITH INTEGRATED SPEAKERS

The current application is a continuation-in-part (CIP) application of a U.S non-provisional application Ser. No. 15/224,947 filed on Aug. 1, 2016.

FIELD OF THE INVENTION

The present invention relates generally to hanging structures for shower curtains and window curtains. More specifically, the present invention is a hanging structure for shower curtains and/or window curtains which includes an integrated fan assembly and a plurality of speakers to increase the comfort of a bather or a user within the structure's vicinity. The integrated fan assembly blows/circulates air directly onto and around the user. The integrated fan assembly may blow ambient temperature air or heated air.

BACKGROUND OF THE INVENTION

The present invention is a curtain hanging structure with integrated beneficial features, a multitude of fan assemblies and a multitude of waterproof speakers. One particular use of the present invention is a shower curtain holder. The present invention is used to hold a shower curtain in a traditional method, through a multitude of hooks. Unlike traditional shower curtain hangers, the present invention provides a bather with the ability to play music in the bathroom without fear of electrocution and/or the possibility of damaging the music source. Currently, there are waterproof musical devices that is available to the public, but such devices are freestanding and require the user to dedicate space within the bathroom specifically for the device that is outside the shower. This, most often times, compromises the quality of the sound produced due to sound dampening caused by shower curtains and the noise produced by water flow. The present invention overcomes these problems through the integration of waterproof speakers directly into the shower curtain holder and allows the bather to wirelessly stream music through said waterproof speakers.

Another feature of the present invention that benefits the bather/user is the multitude of integrated fan assemblies. The fan assemblies blow air directly onto the bather after he or she steps out of the shower and is drying off. The fan assemblies may be implemented to blow ambient temperature air or heated air, depending on the preferences and needs of the user. The fan assemblies help the bather dry faster and increases his or her comfort level as stepping out of a hot shower is associated with a decrease in temperature felt by the body. Additionally, the present invention includes an external thermometer in order activate the fan assemblies anytime the temperature within the bathroom is within or out of a preset range, determined by the bather. The multitude of fan assemblies and the multitude of waterproof speakers are powered by a power source, in particular an at least one rechargeable battery.

The present invention may also be utilized outside the bathroom, in particular to hold window curtains. If used to hold window curtains, the user may integrate the multitude of waterproof speakers into his or her surround sound system. Additionally, the fan assemblies are ideal in addressing drafty windows or windows on a door. The fan assemblies may be configured to turn on when the temperature drops below a predefined setting, thus heating the interior space and saving the user in heating costs. In order to further save the user on heating and powering costs, the structure may contain a multitude of solar panel cells that are oriented towards the outdoors in order to recharge the internal battery.

DETAIL DESCRIPTIONS OF THE INVENTION

Figure 1:
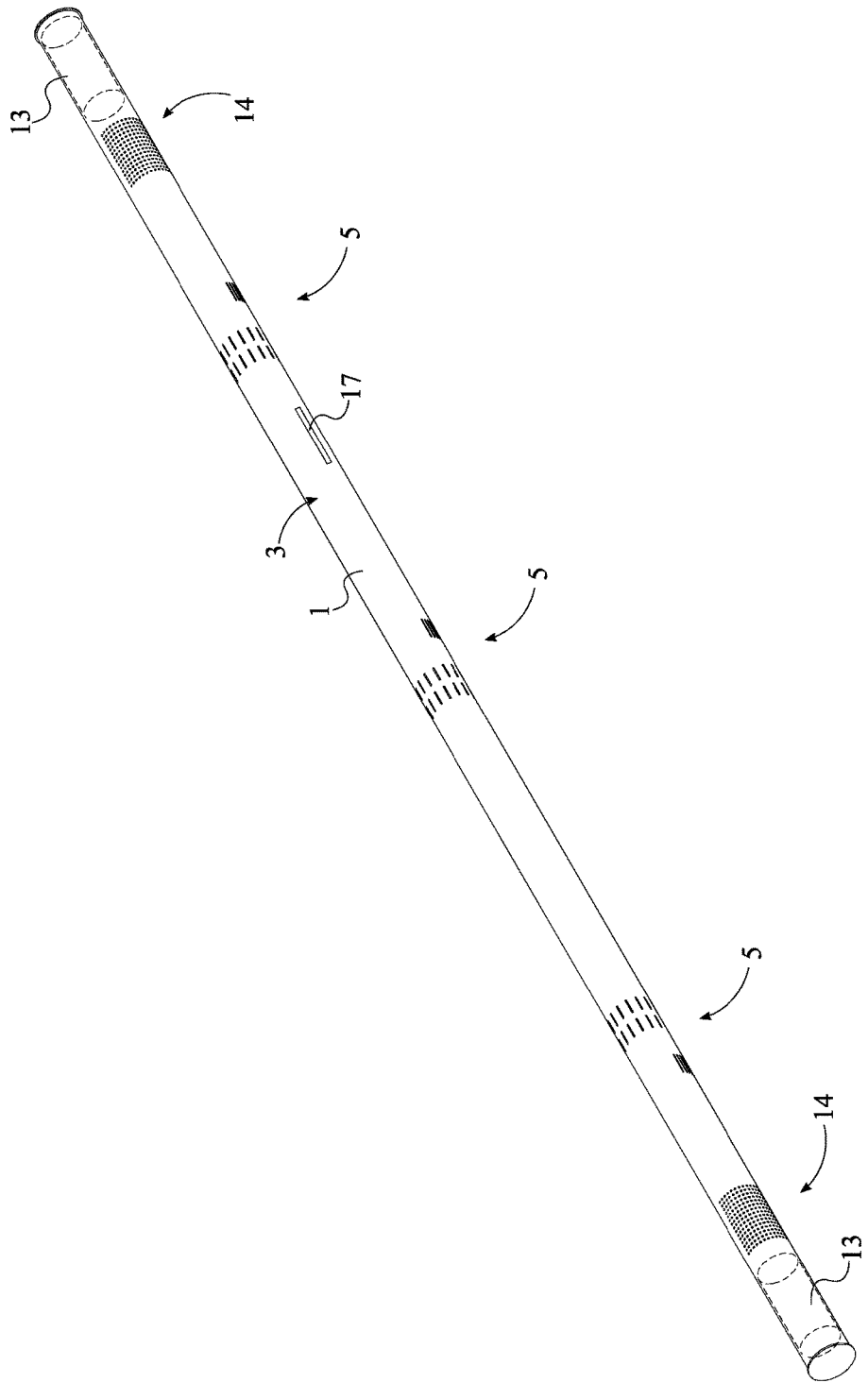
FIG. 1 is a perspective view of the present invention, wherein a power supply is a rechargeable battery.

All illustrations of the drawings are for the purpose of describing selected versions of the present invention and are not intended to limit the scope of the present invention.

The present invention is a hands-free speaker with voice commands and calling capabilities that is integrated into a supporting structure for window curtains and shower curtains. The present invention allows a user to listen to audio, command and interact with external electronic devices, as well as receive and make calls. More specifically, the present invention comprises a tubular body 1, an at least one waterproof speaker 14, a wireless communication device 15, a microcontroller 16, a power supply 13, an at least one microphone 19, and an at least one activation button 4.

Figure 7:
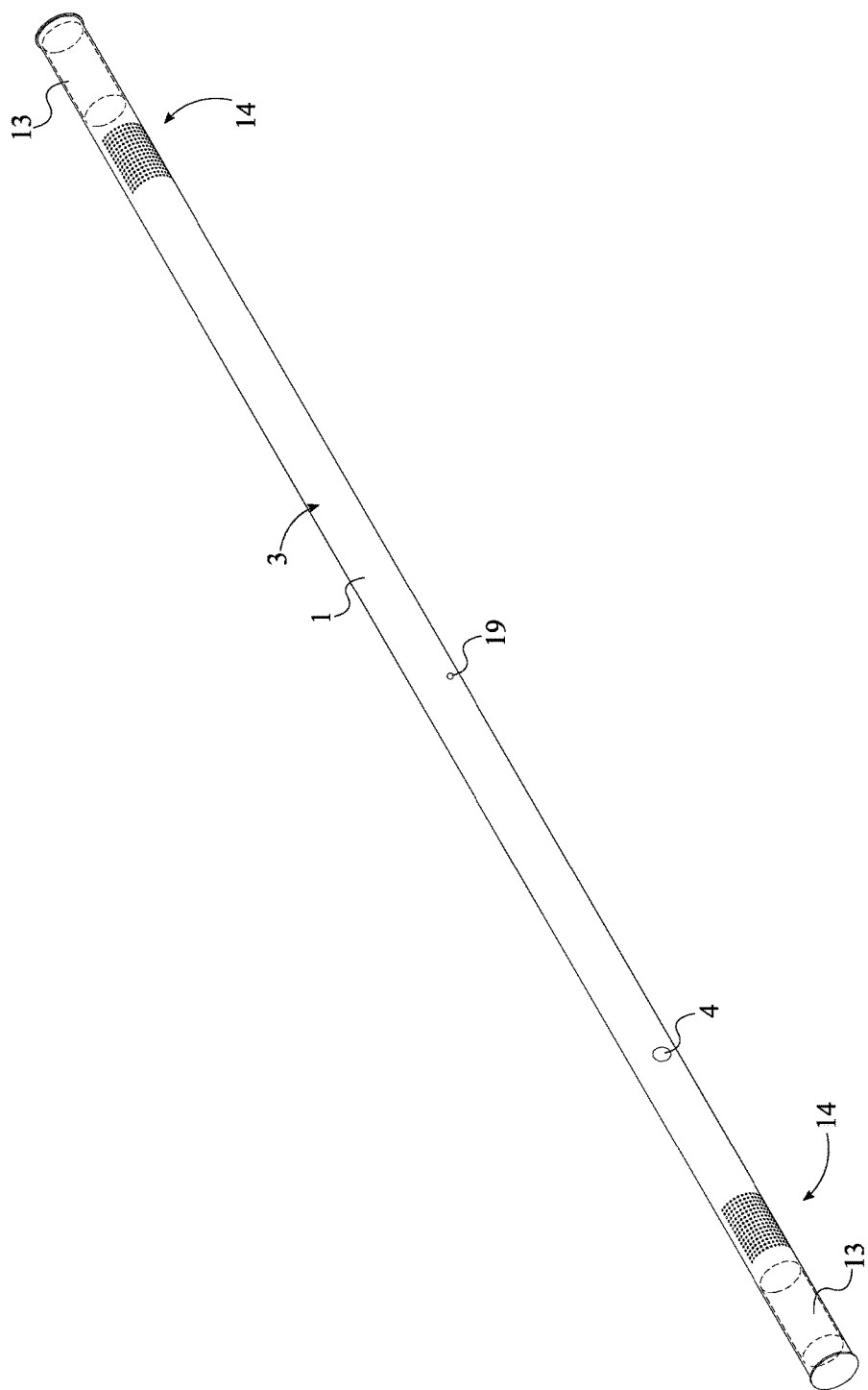
FIG. 7 is a perspective view of another embodiment of the present invention.

Referring to FIG. 1 and FIG. 7, the tubular body 1 houses the constituents of the present invention and acts as the hanging structure for curtains such as shower curtains and window curtains, similar to traditional curtain rods. The shape, design, and sizing of the tubular body 1 may be implemented similar to traditional curtain rods. A cross section of the tubular body 1 is preferably circular and is sized to compliment current curtain hooks available on the market. The length of the tubular body 1 is subject to change in order to fit different bathroom and window sizes. The tubular body 1 may extent along a straight line or may be curved along a semi-circular path. In order to extend the product life-cycle of the present invention, the tubular body 1 is composed of anti-corrosion material such as stainless steel. The anti-corrosion material is especially necessary if the present invention is used in the bathroom environment as the present invention would be exposed to water for a prolonged amount of time; alternative material compositions may also be utilized. In one embodiment of the present invention, the tubular body 1 comprises a multitude of segments that are fitted within each other in order to allow for relative movement between the segments. This allows the user to easy adjust the length of the tubular body 1 to his or her personal needs and preferences. The telescopic feature may be implemented through a variety of means and is not meant to limit the scope of the present invention.

The wireless communication device 15 is internally mounted within the tubular body 1 and allows various external computing devices to connect, control, and interact with the present invention. In particular, the wireless communication allows the user to stream audio to the present invention in order to be sounded by the waterproof speaker 14. Type of technologies that may be used for the wireless communication device 15 include, but are not limited to, Bluetooth technologies and Wi-Fi technologies. The wireless communication device 15 allows the present invention to connect to devices such as smartphones, tablets, and other similar devices with wireless communication capabilities. In one embodiment, the wireless communication device 15 allows external devices to control the present invention. The waterproof speaker 14 sounds audio from an external source through the wireless communication device 15. The waterproof speaker 14 is integrated into an external surface 3 of the tubular body 1, oriented outwards. The sizing, wattage, and other characteristics of the waterproof speaker 14 are subject to change in order to accommodate user preferences and different applications. The microphone 19 is a transducer which converts sound into corresponding electrical signals. Similar to the waterproof speaker 14, the microphone 19 is integrated into the external surface 3 of the tubular body 1. The microphone 19 is used to receive voice commands from the user as well as conduct phone calls through the present invention.

Figure 6:
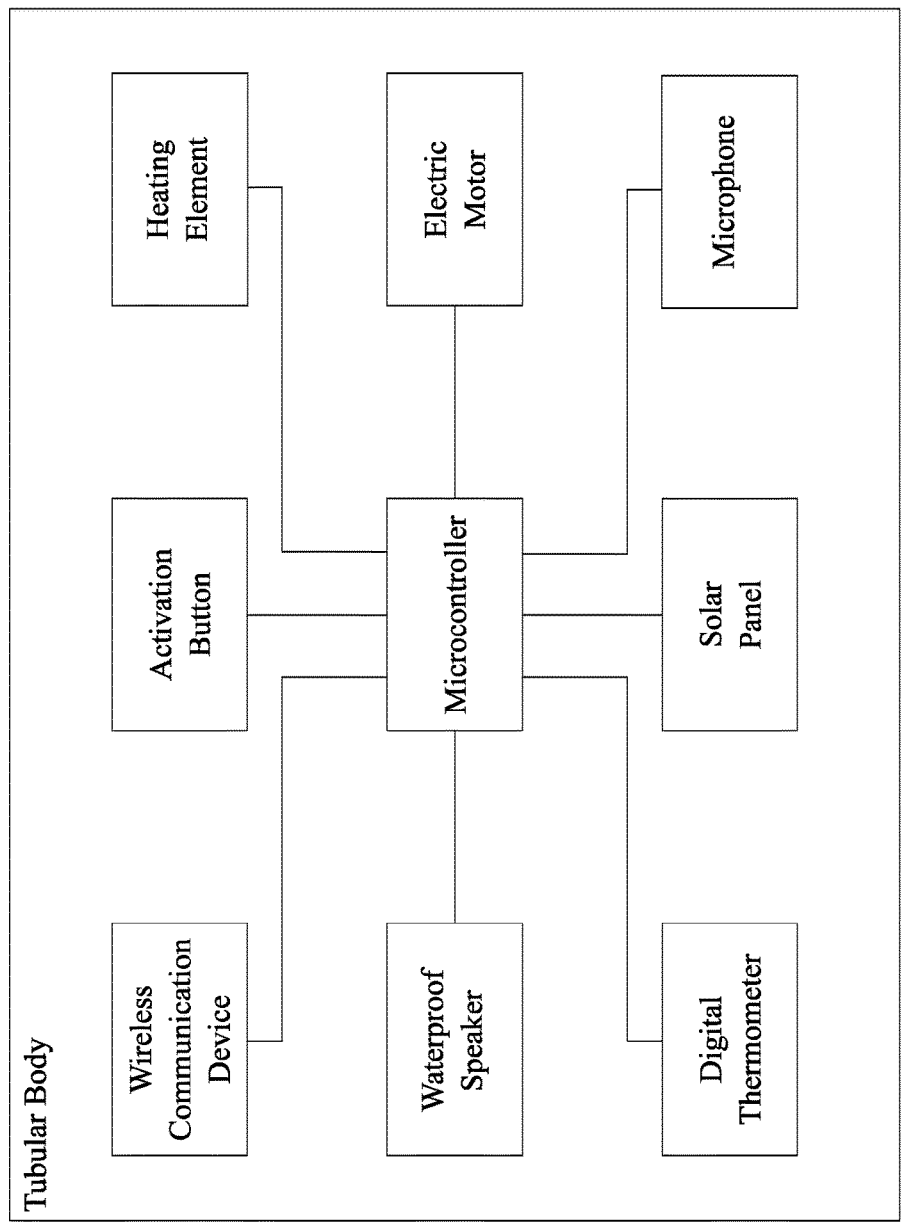
FIG. 6 is an electronic schematic of the present invention.

Referring to FIG. 6, the microcontroller 16 controls the electronic components of the present invention based on preset programming and user input; type of user input includes physical buttons and command signals received through the wireless communication device 15. The microcontroller 16 is internally mounted within the tubular body 1 and is electronically connected to the wireless communication device 15, the waterproof speaker 14, the microphone 19. The power supply 13 provides the electric energy required for the operations of the present invention. More specifically, the power supply 13 is electrically connected to the waterproof speaker 14, the wireless communication device 15, the microphone 19, and the microcontroller 16. A variety of sources and devices may be used as the power supply 13 including, but not limited to, a battery pack, an outlet, an electric generator, and other similar electrical sources.

It is preferred that the power supply 13 is an at least one rechargeable battery 13. The rechargeable battery 13 is removably mounted within the tubular body 1 in order to allow the user to easy access the rechargeable battery 13 for recharging. Additionally, the rechargeable battery 13 is terminally positioned along the tubular body 1. This feature may be implemented in a variety of ways. One way includes mounting the rechargeable battery 13 at an end of the tubular body 1, adjacent to a removable end-cap. The removable end-cap acts as a cover to retain the rechargeable battery 13 within the tubular body 1. In order to remove the rechargeable battery 13, all the user needs to do is disengage the removable end-cap from the rest of the tubular body 1 and pull out the rechargeable battery 13. A variety of battery types may be used for the rechargeable battery 13 component such as nickel cadmium batteries, lead acid batteries, lithium ion batteries, and lithium polymer batteries to name a few non-limiting examples. Additionally, the size, capacity, and other characteristics of the rechargeable battery 13 may vary to accommodate the power consumption requirements of the electronic constituents of the present invention. In another embodiment, the present invention further comprises a waterproof battery caddy 20. The waterproof battery caddy 20 acts as an additional power source of the present invention. The waterproof battery caddy 20 is mounted external to the tubular body 1 and is electrically connected to the rechargeable battery 13. The waterproof battery caddy 20 provides additional charge to the rechargeable battery 13 to either recharge the rechargeable battery 13 or to act as an auxiliary power for the electrical components of the present invention.

The activation button 4 is a switch which converts a physical movement into an electrical signal within a circuit. The activation button 4 allows the user to interact with the present invention, for example to answer a call or to switch audio being played by the present invention. The activation button 4 is integrated into the external surface 3 of the tubular body 1 for easy access. Additionally, the activation button 4 is electronically connected to the microcontroller 16.

The present invention is an extremely versatile curtain rod. The present invention can be wirelessly connected to a mobile phone or other similar portable computing devices. Resultantly, the present invention allows the user to make and receive phone calls, stream audio, and connect to various external devices. In one example, the present invention may be wirelessly connected to a door locking system, wherein the user is capable of locking or unlocking the front door with the activation button 4 or a voice command. Additionally, the present invention may be used to control other external computing devices such as a hands-free speaker, computer. Furthermore, the present invention may be wirelessly connected to an external computing device which includes a built-in intelligent assistant. This resultantly allows the user to perform a variety of tasks. For example, the activation button 4 may be configured to turn on the intelligent assistant and through the intelligent assistant the user may order any items instantly while in the middle of showering, for example hygienic items. Furthermore, in one embodiment, the activation button 4 may be implemented as a quick buy button, wherein when pressed the quick buy button instantly orders specific items and ships said items to the user's house, the type of items ordered may be configured by the user to meet his or her needs and preferences.

In another embodiment, the present invention further comprises an at least one fan assembly 5. The fan assembly 5 is used to blow/circulate air around the tubular body 1. In one embodiment of the present invention, the fan assembly 5 blows warm air. In another embodiment of the present invention, the fan assembly 5 blows ambient air. When the present invention is used to support a window curtain for a window/door, the warm air heats the proximal interior space and is used to address drafty windows to increase the comfort of individuals near the window/door and within the building. When the present invention is used to support a shower curtain in a bathroom, the warm air increases the temperature within the bathroom before, during, and after the shower. Additionally, the fan assembly 5 blows air directly onto a bather after he or she steps out of the shower and is drying off.

Figure 4:
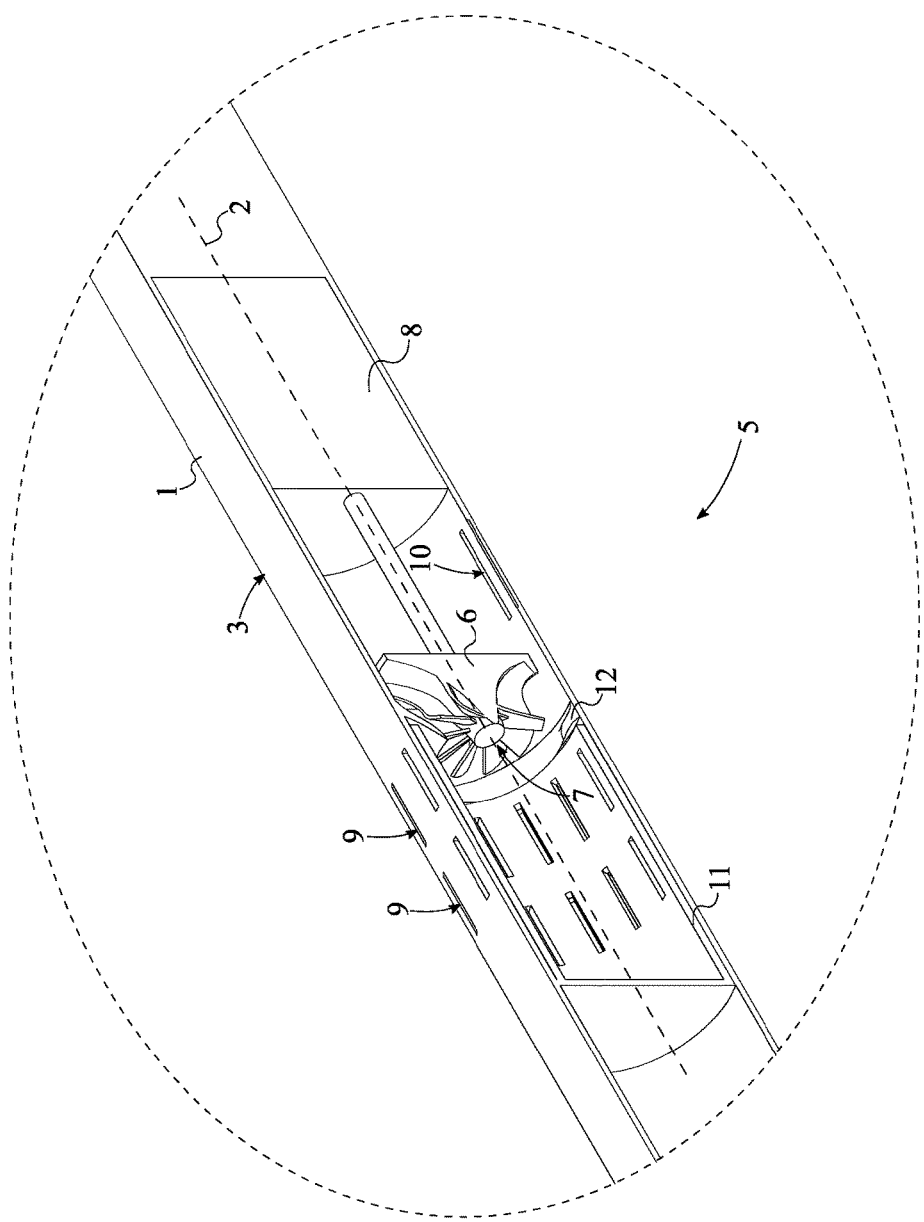
FIG. 4 is a perspective detailed view of the present invention taken about the circle B in FIG. 3, wherein the power supply is a rechargeable battery.

Referring to FIG. 4, the fan assembly 5 produces an air current the surrounding area around the present invention. The fan assembly 5 is internally mounted within the tubular body 1 and comprises an impeller 6, an electric motor 8, a plurality of inlet slots 9, a plurality of outlet slots 10. The impeller 6 creates air flow through the fan assembly 5. The impeller 6 is oriented along a main axis 2 of the tubular body 1 as seen in FIG. 4 in order to create an air flow along the main axis 2 of the tubular body 1. The electric motor 8 converts electric energy into rotational energy in order to rotate the impeller 6 at a specific speed, thus forcing air to flow through the fan assembly 5. More specifically, the electric motor 8 is axially connected to the impeller 6, opposite an inlet side 7 of the impeller 6. The inlet side 7 of the impeller 6 denotes the side of the impeller 6 that sucks air into the impeller 6, in some impeller 6 designs the inlet side 7 is known as an eye inlet.

Figure 3:
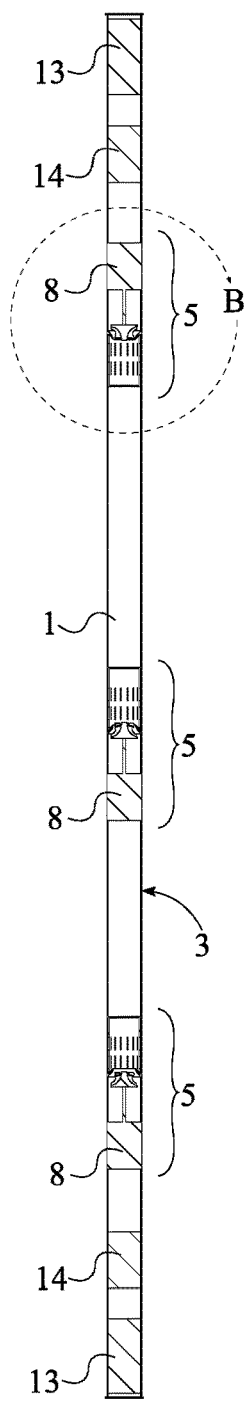
FIG. 3 is a sectional view of the present invention taken about line A-A in FIG. 2, wherein the power supply is a rechargeable battery.

The plurality of inlet slots 9 act as the intake side of the fan assembly 5 and is radially traversing through the tubular body 1, adjacent to the inlet side 7 of the impeller 6. The plurality of outlet slots 10 act as the discharge side of the fan assembly 5, and is radially traversing through the tubular body 1. Referring to FIG. 3 and FIG. 4, the plurality of inlet slots 9 and the plurality of outlet slots 10 are positioned opposite to each other, across the impeller 6. As a result, the plurality of inlet slots 9 is in fluid communication with the plurality of outlet slots 10 through the impeller 6.

Figure 5:
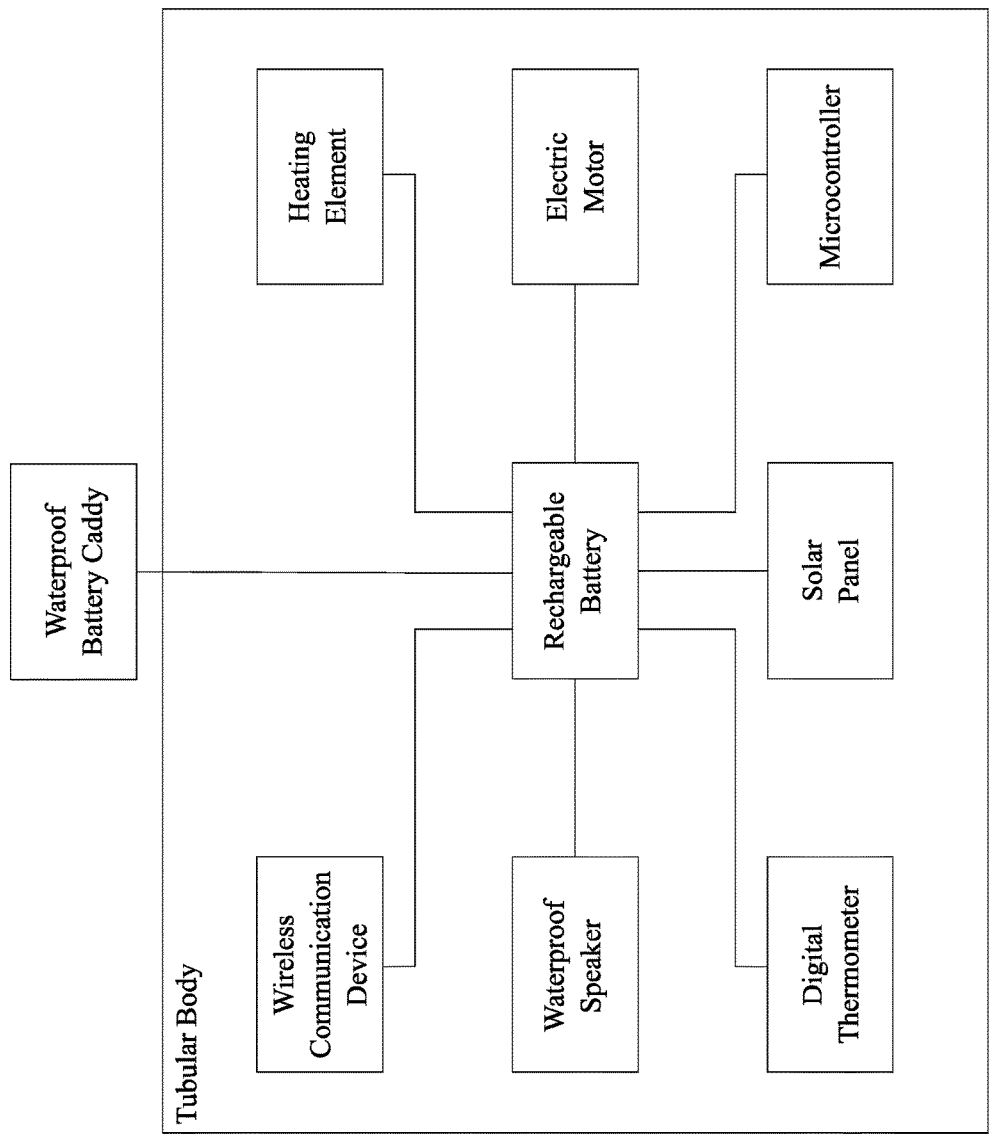
FIG. 5 is an electric schematic of the present invention, wherein the power supply is a rechargeable battery.

In one embodiment of the present invention, the fan assembly 5 further comprises a heating element 11. The heating element 11 converts electric energy into heat and is positioned adjacent to the impeller 6. A variety of technologies may be used for the heating element 11 including, but not limited to, resistance wire, etched foil, ceramic-based heating elements, and silicone rubber heating elements. The preferred heating element 11 is a silicone-rubber heater sleeve 11. The silicone-rubber heater sleeve 11 is positioned adjacent to the plurality of inlet slots 9 and is internally connected to the tubular body 1 as seen in FIG. 4. The silicone-rubber heater is relatively light and thin, ideal for small spaces such as inside the tubular body 1. Additionally, the silicone-rubber heater provides a uniform and rapid heating pattern, ideal for heating a flow of air through the fan assembly 5. As seen in FIG. 5, the fan assembly 5 is powered by the power supply 13 and controlled by the microcontroller 16. More specifically, the power supply 13 is electrically connected to the electric motor 8 and the heating element 11. Similarly, the microcontroller 16 is electronically connected to the electric motor 8 in order to control the speed of the electric motor 8.

When activated, the fan assembly 5 first pulls air into the internal space of the tubular body 1 through the plurality of inlet slots 9. Next, the air is pumped past the heating element 11, thus raising the temperature of the air. Finally, the heated air is pumped out of the tubular body 1 by the impeller 6 through the plurality of outlet slots 10 into the area around the tubular body 1.

Referring to FIG. 4, the fan assembly 5 further comprises an annular air diffuser 12 in order to efficiently redirect the air flow from the inlet of the impeller 6, through a multitude of vanes of the impeller 6, and out of the plurality of outlet slots 10. The annular air diffuser 12 is internally mounted within the tubular body 1 and is concentrically positioned around the impeller 6. The annular air diffuser 12 includes a plurality of complimentary vanes that are oriented to receive air flow from the impeller 6 and redirect said air flow past the impeller 6 and towards the plurality of outlet slots 10. To further aid in air flow, the shower curtain being held by the present invention may be partially perforated.

In one embodiment, the present invention further comprises a digital thermometer 17. The digital thermometer 17 records a current temperature directly around the tubular body 1. Referring to FIG. 1, the digital thermometer 17 is externally mounted to the tubular body 1, preferably flush with an external surface 3 of the tubular body 1. Additionally, the digital thermometer 17 is electrically connected to the power supply 13 and is electronically connected to the microcontroller 16. The temperature information gathered by the digital thermometer 17 may be used to operate the present invention automatically, based on pre-set rules. In particular, the temperature information would allow for the user to set a temperature threshold for the present invention which dictates under which conditions the fan assembly 5 is to be turned on. For example, once set, the fan assembly 5 may be configured to turn on anytime the temperature directly around the tubular body 1 drops lower or higher than the temperature threshold. Another possible implementation may include an operating temperature range wherein the fan assembly 5 is turned on within the range, lower than the range, or higher than the range.

Figure 2:
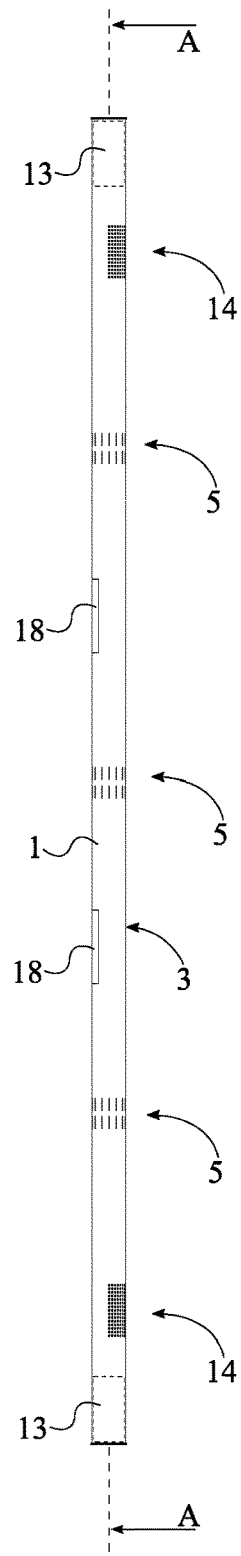
FIG. 2 is a top view of the present invention, wherein the power supply is a rechargeable battery.

In yet another embodiment, the present invention further comprises an at least one solar panel 18. This embodiment is for implementing the present invention as a window curtain support. The solar panel 18 absorbs and converts the sun's rays into electrical energy. Said electrical energy is used to charge the rechargeable battery 13, thus increasing the operating time of the present invention and saving the user money in relation to the power bill. Referring to FIG. 2, the solar panel 18 is integrated into the external surface 3 of the tubular body 1 and is oriented outwards. Additionally, the solar panel 18 is electrically connected to the rechargeable battery 13 and is electronically connected to the microcontroller 16. The size, type, shape, and other similar characteristics of the solar panel 18 may differ in order to meet the specific needs and requirements of the user.

In another embodiment, the present invention includes a multitude of the aforementioned components in order to adequately cool off the area around the tubular body 1 as well as produce quality sound. In this embodiment, the at least one fan assembly 5 comprises a plurality of heating fan assemblies. In particular, the plurality of fan assemblies includes three assemblies. The plurality of fan assemblies is equally distributed about the length of the tubular body 1. Additionally, the at least one waterproof speaker 14 comprises a plurality of waterproof speakers 14. The plurality of waterproof speakers 14 is equally distributed about the length of the tubular body 1. In order to power the aforementioned components, the at least one rechargeable battery 13 includes a first battery and a second battery. The first battery and the second battery are mounted within either end of the tubular body 1 as seen in FIG. 2 through FIG. 3.

Although the invention has been explained in relation to its preferred embodiment, it is to be understood that many other possible modifications and variations can be made without departing from the spirit and scope of the invention as hereinafter claimed.

What is claimed is:

1. A curtain rod with integrated speakers comprises:
    a tubular body;
    an at least one waterproof speaker;
    a wireless communication device;
    a microcontroller;
    an at least one microphone;
    a power supply;
    the wireless communication device and the microcontroller being internally mounted within the tubular body;
    the waterproof speaker being integrated into an external surface of the tubular body;
    the microphone being integrated into the external surface of the tubular body;
    the microcontroller being electronically connected to the waterproof speaker, the wireless communication device, and the microphone; and
    the power supply being electrically connected to the waterproof speaker, the wireless communication device, the microcontroller, and the microphone.

2. The curtain rod with integrated speakers as claimed in claim 1 comprises:
an at least one activation button;
the activation button being integrated into the external surface of the tubular body; and
the microcontroller being electronically connected to the activation button.

3. The curtain rod with integrated speakers as claimed in claim 1 comprises:
the power supply being an at least one rechargeable battery;
the rechargeable battery being removably mounted within the tubular body; and
the rechargeable battery being terminally positioned along the tubular body.

4. The curtain rod with integrated speakers as claimed in claim 3 comprises:
a waterproof battery caddy;
the waterproof battery caddy being mounted external to the tubular body; and
the waterproof battery caddy being electrically connected to the rechargeable battery.

5. The curtain rod with integrated speakers as claimed in claim 1 comprises:
an at least one fan assembly;
the fan assembly comprises an impeller, an electric motor, a plurality of inlet slots, and a plurality of outlet slots;
the fan assembly being internally mounted within the tubular body;
the impeller being oriented along a main axis of the tubular body;
the electric motor being axially connected to the impeller, opposite an inlet side of the impeller;
the plurality of inlet slots radially traversing through the tubular body, adjacent to the inlet side of the impeller;
the plurality of outlet slots radially traversing through the tubular body;
the plurality of inlet slots and the plurality of outlet slots being positioned opposite to each other, across the impeller;
the plurality of inlet slots being in fluid communication with the plurality of outlet slots through the impeller; and
the power supply being electrically connected to the electric motor.

6. The curtain rod with integrated speakers as claimed in claim 5 comprises:
the fan assembly further comprises a heating element;
the heating element being positioned adjacent to the impeller; and
the power supply being electrically connected to the heating element.

7. The heating curtain rod with integrated speakers as claimed in claim 6 comprises:
the heating element being a silicone-rubber heater sleeve;
the silicone-rubber heater sleeve being positioned adjacent to the plurality of inlet slots; and
the silicone-rubber heater sleeve being internally connected to the tubular body.

8. The curtain rod with integrated speakers as claimed in claim 5 comprises:
a digital thermometer;
the digital thermometer being externally mounted to the tubular body;
the microcontroller being electronically connected to the heating element and the digital thermometer; and
the power supply being electrically connected to the digital thermometer.

9. The curtain rod with integrated speakers as claimed in claim 5 comprises:
the fan assembly further comprises an annular air diffuser;
the annular air diffuser being internally mounted within the tubular body; and
the annular air diffuser being concentrically positioned around the impeller.

10. The curtain rod with integrated speakers as claimed in claim 1 comprises:
an at least one solar panel;
the solar panel being integrated into the external surface of the tubular body;
the power supply being electrically connected to the solar panel; and
the microcontroller being electronically connected to the solar panel.

* * * * *